(12) United States Patent
Beattie, Jr. et al.

(10) Patent No.: US 8,762,520 B2
(45) Date of Patent: Jun. 24, 2014

(54) METHOD AND SYSTEM TO DETECT A PREDICTIVE NETWORK SIGNATURE

(75) Inventors: James Gordon Beattie, Jr., Bergenfield, NJ (US); Stephen J. Griesmer, Westfield, NJ (US); Arvind Ramdas Mallya, Walnut Creek, CA (US); Edward Marsh, Sunnyvale, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

(21) Appl. No.: 12/830,109

(22) Filed: Jul. 2, 2010

(65) Prior Publication Data

US 2012/0005333 A1 Jan. 5, 2012

(51) Int. Cl.
*G06F 15/173* (2006.01)

(52) U.S. Cl.
USPC ........... 709/224; 709/208; 709/220; 709/222; 709/223

(58) Field of Classification Search
USPC .......................... 709/224, 208, 220, 222, 223
See application file for complete search history.

(56) References Cited

U.S. PATENT DOCUMENTS

| | | | |
|---|---|---|---|
| 4,991,210 A | 2/1991 | Chaum | |
| 5,633,931 A | 5/1997 | Wright | |
| 5,732,944 A | 3/1998 | Mayer | |
| 5,804,726 A | 9/1998 | Geib et al. | |
| 6,510,398 B1 | 1/2003 | Kundu et al. | |
| 6,873,330 B2 | 3/2005 | Burk et al. | |
| 6,905,091 B2 | 6/2005 | Berson et al. | |
| 6,982,563 B2 | 1/2006 | Hands | |
| 7,006,939 B2 | 2/2006 | Voorakaranam et al. | |
| 7,397,385 B1 | 7/2008 | Bajpay et al. | |
| 7,421,349 B1 | 9/2008 | Stack | |
| 7,464,266 B2 | 12/2008 | Wheeler | |
| 7,620,832 B2 | 11/2009 | Kissell | |
| 7,652,620 B2 | 1/2010 | Lee et al. | |
| 7,847,701 B2 | 12/2010 | Bajpay et al. | |
| 2002/0133772 A1 | 9/2002 | Voorakaranam et al. | |
| 2003/0164835 A1 | 9/2003 | Burk et al. | |
| 2004/0061510 A1 | 4/2004 | Hands | |
| 2005/0098681 A1 | 5/2005 | Berson et al. | |
| 2005/0182932 A1 | 8/2005 | Wheeler | |
| 2005/0201271 A1* | 9/2005 | Hua et al. | 370/216 |
| 2006/0217898 A1 | 9/2006 | Pernestal | |
| 2007/0177624 A1* | 8/2007 | Fossion | 370/463 |
| 2008/0086440 A1 | 4/2008 | Hoey et al. | |
| 2008/0266127 A1 | 10/2008 | Bajpay et al. | |
| 2009/0040098 A1 | 2/2009 | Lee et al. | |
| 2009/0200282 A1 | 8/2009 | Hampton | |
| 2009/0292755 A1 | 11/2009 | Waagen et al. | |
| 2011/0080958 A1 | 4/2011 | Srpljan et al. | |
| 2011/0150269 A1 | 6/2011 | Yoshioka | |
| 2011/0164505 A1* | 7/2011 | Salam et al. | 370/241 |
| 2011/0237291 A1* | 9/2011 | Kirisawa | 455/522 |

* cited by examiner

*Primary Examiner* — Thu Nguyen
*Assistant Examiner* — Lan-Dai T Truong
(74) *Attorney, Agent, or Firm* — Jackson Walker L.L.P.

(57) ABSTRACT

A method and system for monitoring a multimedia content distribution network (MCDN) includes receiving an indication that a network impairment has been detected at an MCDN node. MCDN clients associated with the MCDN node may be analyzed to detect an impairment signature, representing correlated impairments among the MCDN clients. Subsequent incoming service requests for the MCDN node may be bundled into a master service ticket. Users of the MCDN clients may be notified of the detected network impairment and of a status of ongoing remediation efforts.

19 Claims, 7 Drawing Sheets

METHOD AND SYSTEM TO DETECT A PREDICTIVE NETWORK SIGNATURE

BACKGROUND

1. Field of the Disclosure

The present disclosure relates to managing network performance and, more particularly, to detecting a predictive network signature in a multimedia content distribution network (MCDN).

2. Description of the Related Art

Network service provided via an MCDN may be subject to signal impairment. The signal impairment may result in degraded performance that adversely affects end-user experience of multimedia content. The quality control systems of an MCDN service provider may be based on a reactive approach to managing network performance for isolated incidents.

DESCRIPTION OF THE EXEMPLARY EMBODIMENTS

In one aspect, a disclosed method for managing an MCDN includes receiving an indication from an MCDN node that a network impairment has been detected at a first MCDN client port. In response to receiving the indication, the method may further include analyzing additional MCDN client ports sharing the MCDN node with the first MCDN client port to detect an impairment signature associated with the MCDN node. When the impairment signature has been detected at the MCDN node, the method may still further include bundling, by a server, incoming service requests from users associated with the MCDN node into a master service ticket. Impairment information, including the impairment signature, for the MCDN node may then be collected under an index to the master service ticket.

In certain embodiments, the method may further include dispatching a field service call for the MCDN node to remediate the network impairment, based on the impairment information. The impairment information may be collected for a specified minimum period of time prior to said dispatching. The additional MCDN client ports may share an MCDN sub-node with the first MCDN client port. The impairment signature may be indicative of a network impairment correlated in magnitude between the additional MCDN client ports and the first MCDN port. The method may also include notifying at least one of the users that the network impairment has been detected. The indication of the network impairment may be associated with a number of reinitializations of a gateway device at a first MCDN client coupled to the first MCDN client port. The MCDN node may query the gateway device for the number of reinitializations.

In a further aspect, a disclosed computer system for monitoring and managing an MCDN includes a processor couple to memory media. The memory media may include processor instructions executable to receive a message from an MCDN node that an MCDN client port coupled to the MCDN node indicates a number of reinitializations greater than a predetermined threshold. In response to receiving the message, the processor instructions may further be executable to analyze the MCDN node for an impairment signature, while the impairment signature may be indicative of additional MCDN client ports exhibiting multiple reinitializations. When the impairment signature has been detected at the MCDN node, the processor instructions may be executable to combine subsequent service requests associated with the MCDN node into a master service ticket. The message may be received from a gateway at an MCDN client coupled to the MCDN client port. The MCDN node may provide digital subscriber line (DSL) network service via the MCDN client port. The reinitializations may be logged at the MCDN node.

In particular embodiments, the computer system may further include processor instructions executable to initiate a field service call for the MCDN node based on the information associated with the master service ticket, while information, including the impairment signature, for the MCDN node may be collected under an index to the master service ticket. The information may be collected for a specified minimum period of time prior to initiating the field service call. The field service call may be directed towards the combined service requests in the master service ticket. The processor instructions may also be executable to notify at least one of the users sending service requests that the MCDN node is undergoing service.

In yet another aspect, a disclosed computer-readable memory media includes executable instructions for monitoring an MCDN. The instructions may be executable to receive an indication from an MCDN node that a network impairment has been detected at a first MCDN client port, and, in response to the indication, analyze additional MCDN client ports sharing the MCDN node with the first MCDN client port to detect an impairment signature associated with the MCDN node. When the impairment signature has been detected at the MCDN node, the instructions may be executable to bundle subsequent service requests from users associated with the MCDN node into a master service ticket, while impairment information, including the impairment signature, for the MCDN node may be collected under an index to the master service ticket. In response to receiving a service request, the instructions may also be executable to notify at least one of the users sending service requests that the network impairment has been identified.

In given embodiments, the memory media may further include executable instructions to dispatch a field service call for the MCDN node to remediate the network impairment, based on the impairment information. The impairment information may be collected for a specified minimum period of time before the field service call is dispatched. The additional MCDN client ports may share an MCDN sub-node with the first MCDN client port. The impairment signature may be indicative of network impairments correlated in magnitude between the additional MCDN client ports and the first MCDN client port. The indication of the network impairment may be a number of reinitializations of a gateway device at a first MCDN client coupled to the first MCDN client port. The memory media may still further include executable instructions to query the number of reinitializations from the MCDN node and/or the gateway device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
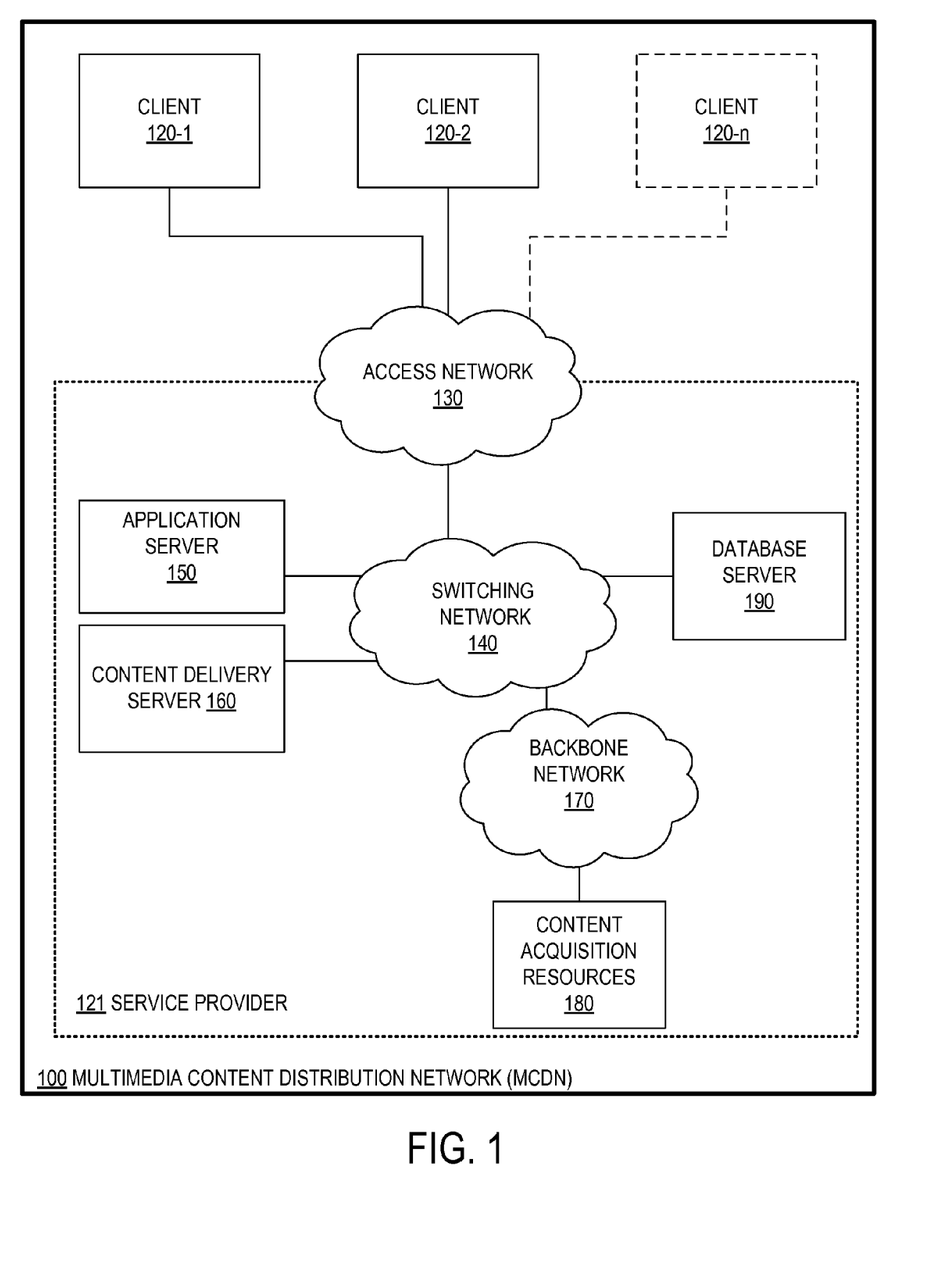
FIG. 1 is a block diagram of selected elements of an embodiment of an MCDN.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs".

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be any number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include DSL connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL Access Multiplexer (DSLAM) that multiplexes many subscriber DSLs to backbone network 170 (see also FIG. 4).

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Figure 2:
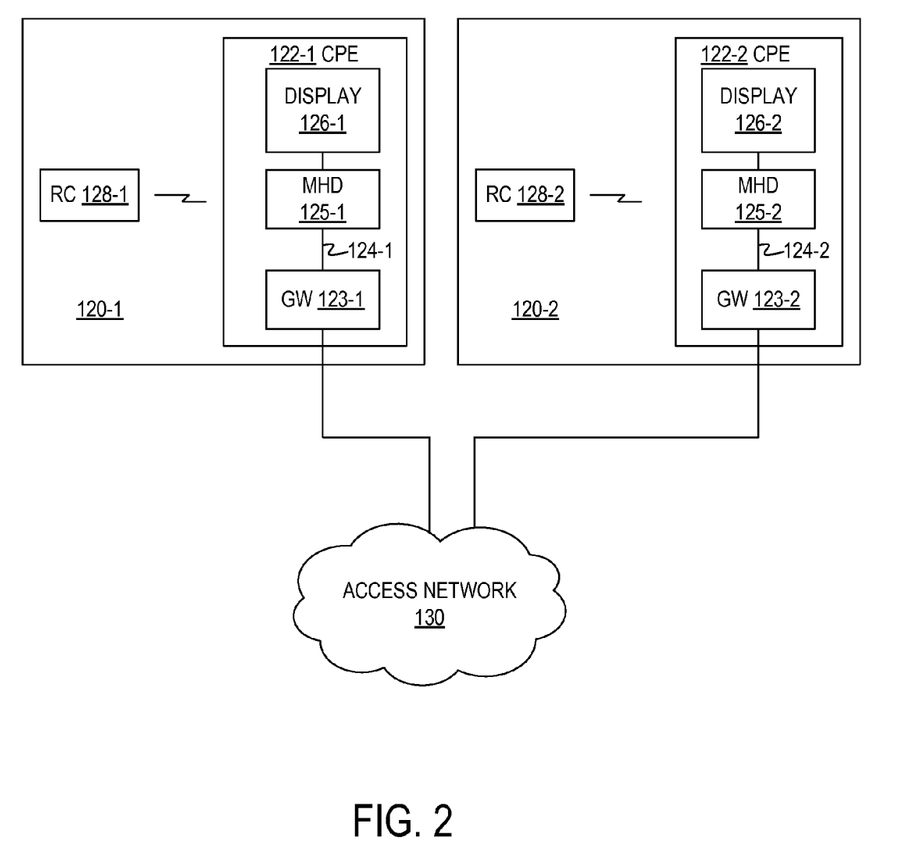
FIG. 2 is a block diagram of selected elements of an embodiment of an MCDN.

Turning now to FIG. 2, clients 120 are shown in additional detail with respect to access network 130. Clients 120 may include a network appliances collectively referred to herein as customer premises equipment (CPE) 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 may be operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a device that is configured to control multiple pieces of equipment. When the equipment controlled by remote control 128 changes, remote control 128 may be reprogrammed, for example, to add a new device. Remote control 128 may be programmed using a local transceiver (see FIG. 3) coupled to CPE 122.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based MCDN.

Figure 3:
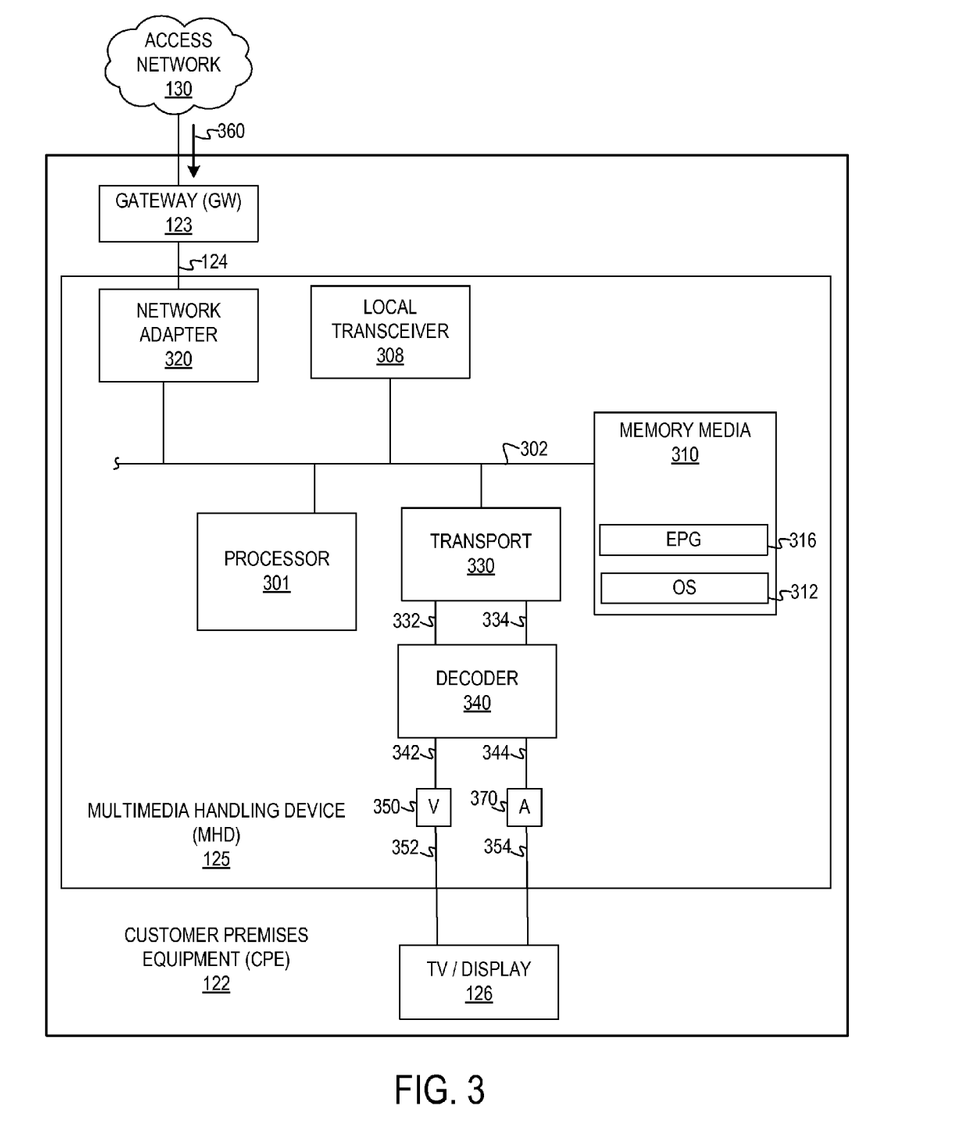
FIG. 3 is a block diagram of selected elements of an embodiment of a multimedia handling device (MHD)

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media, collectively identified as storage or memory media 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Memory media 310 encompasses persistent and volatile media, fixed and removable media, and magnetic and semiconductor media. Memory media 310 is operable to store instructions, data, or both. Memory media 310 as shown may include sets or sequences of instructions, namely, an operating system 312, and EPG 316. Operating system 312 may be a UNIX or UNIX-like operating system, a Windows® family operating system, or another suitable operating system. In some embodiments, memory media 310 is configured to store and execute instructions provided as services to client 120 by application server 150, as mentioned previously.

EPG 316 represents a guide to the multimedia content provided to client 120 via MCDN 100, and may be shown to the user as an element of a user interface. The user interface may include a plurality of menu items arranged according to one or more menu layouts, which enable a user to operate MHD 125. The user may operate the user interface, including EPG 316, using remote control 128 (see FIG. 2).

Local transceiver 308 represents an interface of MHD 125 for communicating with external devices, such as remote control 128, or another remote control device. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by a remote control module (not shown in FIG. 3) for providing remote control functionality.

Figure 4:
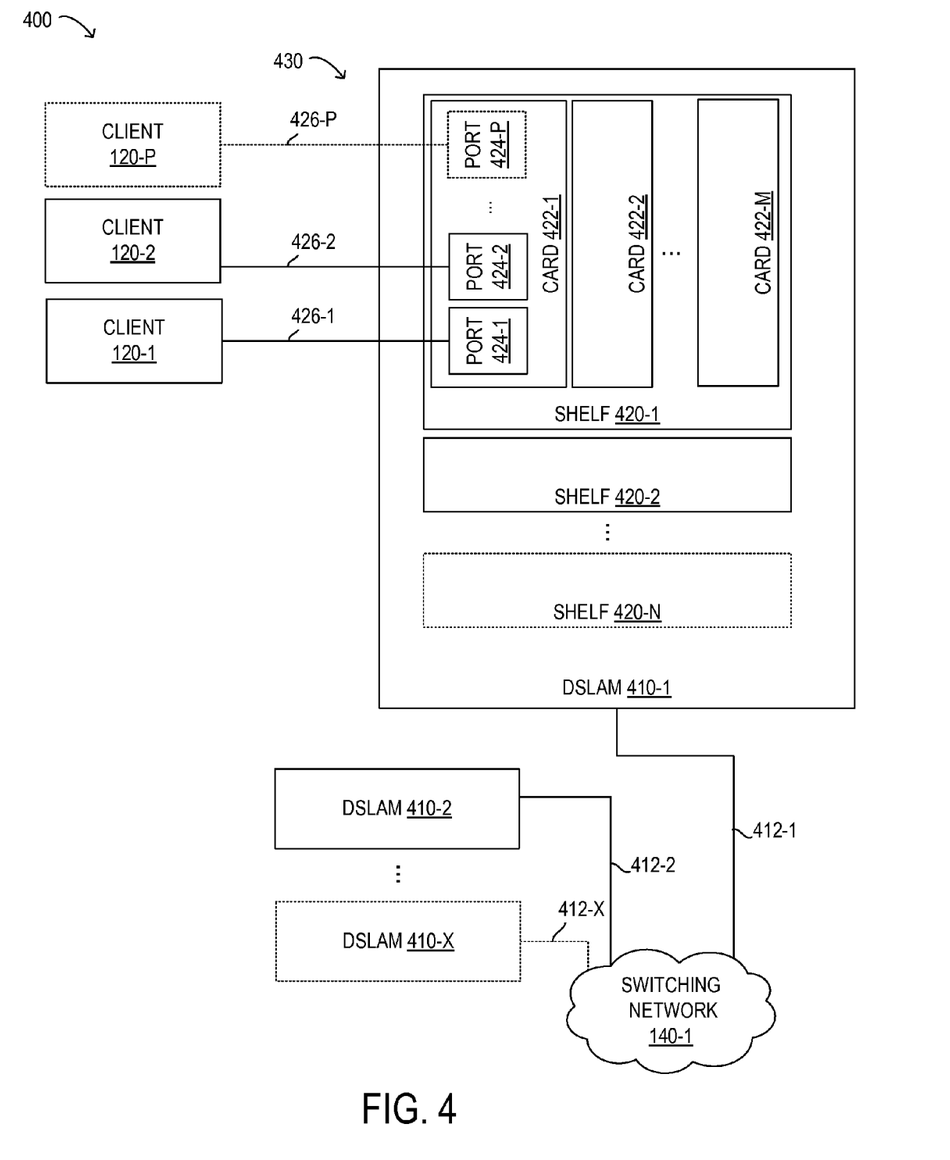
FIG. 4 is a block diagram of selected elements of an embodiment of an MCDN.

Turning now to FIG. 4, a block diagram of selected elements of an embodiment of MCDN 400 is depicted. In MCDN 400, selected elements of one embodiment of access network 430 are depicted in further detail. Access network 430 is shown implementing a DSL architecture, which may represent any of a number of different DSL technologies, such as Asymmetric DSL (ADSL), Very High Speed DSL (VDSL), VDSL2, and other variants thereof, among others. In certain embodiments, access network 430 represents access network 130 (see FIG. 1). It is noted that like numbered elements in FIG. 4 represent components discussed above with respect to FIGS. 1-3.

As shown in FIG. 4, MCDN 400 includes switching network 140-1, which may be one instance, segment, or portion of switching network 140 (see FIG. 1). For example, switching network 140-1 may represent elements of switching network 140 providing MCDN service to a particular geographic region or area. As discussed above with respect to FIG. 1, switching network 140-1 represents infrastructure of MCDN service provider 121, which may correspond to the provider's central office, from where network service for a particular MCDN segment is provided. Accordingly, switching network 140-1 is shown with network termination (NT) links 412 (also referred to as uplinks) to a respective plurality of DSLAMs 410. Specifically, NT link 412-1 provides an uplink for DSLAM 410-1, NT link 412-2 provides an uplink for DSLAM 410-2, and so on for a plurality of uplinks, up to NT link 412-X for DSLAM 410-X, where X represents a number of DSLAMs 410 which are uplinked to switching network 140-1. Each individual DSLAM 410 may provide service for a certain number of MCDN clients, as will be described in detail below.

In FIG. 4, DSLAM 410-1 is shown in further detail including additional elements, which have been omitted in the depiction of DSLAM 410-2 and 410-X for clarity. It will be understood that DSLAM 410-1 is generally representative for any given DSLAM 410, and that a particular DSLAM 410 may be variously configured with different numbers of elements and sub-elements, as desired. As used herein, DSLAM 410 represents an "MCDN node" or simply "node," while elements included within DSLAM 410 are referred to as an "MCDN sub-node" or "sub-node." NT links 412 thus represent an uplink between an MCDN node serving a given plurality of MCDN clients 120 and switching network 140, representing other portions of MCDN 400 (not shown in FIG. 4, see FIG. 1).

As shown in FIG. 4, DSLAM 410-1 includes a number of shelves 420, shown as shelf 420-1, shelf 420-2, and so on, up to shelf 420-N, where N represents a number of shelves 420 included within DSLAM 410-1. It is noted that different DSLAMs 410 may be equipped with a different number of shelves 420. In FIG. 4, shelf 420-1 is shown in further detail including additional elements, which have been omitted from the depiction of shelf 420-2 and 420-N for clarity. Shelf 420 may generally represent an equipment rack for accommodating a number of cards 422 and may provide a connection bus for terminating, powering, and interconnecting cards 422. DSLAM 410 may further include equipment (not explicitly shown in FIG. 4) for bundling network connections from a plurality of cards 422, also known as line termination (LT) cards, via shelves 420 to at least one NT link 412.

As illustrated in FIG. 4, shelf 420-1 may include representative card 422-1, card 422-2, and so on up to card 422-M, where M represents a number of cards 422 that may be accommodated in shelf 420-1. It is noted that different shelves 420 may accommodate a different number of cards 422. In FIG. 4, card 422-1 is shown in further detail including additional elements, which have been omitted from card 422-2 and card 422-M for clarity. Card 422-1 is shown with a number of ports 424 for providing service to individual MCDN clients 120 via respective LT links 426. LT link 426 may represent a DSL connection (i.e., signal loop) to the premises of client 120. Specifically, port 424-1 is linked to client 120-1 via LT link 426-1, port 424-2 is linked to client 120-2 via LT link 426-2, and so on, up to port 424-P linking client 120-P via LT link 426-P, where P represents a number of ports that card 422-1 is configured to provide. It is noted that LT link 426 may terminate at client 120 via GW 123, such that multimedia content 360 is delivered via LT link 426 (see FIG. 3). Card 422-1 may further include additional elements (not shown in FIG. 4) for providing connections from ports 424 to shelf 420 (for example, via a bus backplane) and ultimately to NT link 412. It is also noted that different cards 422 may be configured with different numbers of ports 424.

In review, the elements of MCDN 400 shown in FIG. 4 represent an MCDN architecture suitable for providing DSL network service to a community of clients 120 via DSLAM 410. A large number of DSLAMs 410 may be installed to provide service to a number of neighborhoods, cities, and other localities. Accordingly, client 120 may be coupled to MCDN 400 via port 424, card 422, shelf 420, and DSLAM 410. The MCDN architecture represented by MCDN 400 may thus allow MCDN service provider 121 (see FIG. 1) to individually address and communicate with nodes, sub-nodes and MCDN clients 120.

The physical implementation of LT link 426 may involve various cabling and termination elements, which may be routed and bundled in a number of different configurations. LT link 426 may thus be exposed to, or come in proximity to, a number of different sources of electromagnetic interference. When LT link 426 represents a galvanic connection, or includes galvanic elements, transmission line effects may increase the susceptibility of LT 426 to environmental noise. Electromagnetic interference resulting in noise may originate from sources internal or external to the MCDN, and may become coupled to an MCDN signal transmitted via LT link 426. When the MCDN signal is degraded (i.e., a signal-to-noise ratio is reduced), this is referred to herein as "signal impairment." In MCDN 400, signal impairment may be introduced to the MCDN signal of a given client 120 via any element in the MCDN architecture, including GW 123, LT link 426, port 424, card 422, shelf 420, DSLAM 410, and other elements (not shown in FIG. 4).

Furthermore, as evident from MCDN 400, clients 120 may have their MCDN signals coupled together through any shared or proximate element in the MCDN architecture where signal impairment is introduced, as noted above. Thus, equipment associated with MCDN client 120-1 may cause signal impairment for a number of other MCDN clients 120. It is noted that a user of MCDN client 120 may experience a degradation of network performance that may be the result of signal impairment or another cause. Other causes of network degradation may include upstream issues, such as, but not limited to: equipment failure within DSLAM 410, network traffic congestion at DSLAM 410, network traffic congestion at NT link 412, network issues at switching network 140, and other causes.

In certain instances, for example, when a common source of signal impairment affects a number of different MCDN clients 120, characteristic indications of the impairment, referred to herein as an "impairment signature", may be observed. An impairment signature may represent correlated network impairments among a number of MCDN clients 120. The network impairments associated with an impairment signature may be correlated in time, magnitude, duration, and combinations thereof, among other aspects. In some embodiments, the impairment signature may be associated with a given MCDN node (e.g., DSLAM 410). The indication of the network impairment may be any of various network service parameters, as will be described below.

Service provider 121 (see FIG. 1) may provide various types of support for users of MCDN clients 120 in order to manage performance of MCDN 400 and maintain a desired quality of service. For example, a user of MCDN client 120 may report an issue with network performance to service provider 121 and may request service to remediate a particular network connection. Service provider 121 may then perform network diagnostics to determine a cause of the reported issue. The diagnostics may include assessments of network infrastructure, such as the MCDN architecture described above with respect to MCDN 400. The diagnostics may involve determining whether an issue with NT link 412 has been reported. When NT link 412 has been found to be operating normally, the network diagnostics may then focus on DSLAM 410 providing service to the reporting MCDN client 120. The network diagnostics may attempt to identify whether a signal impairment is associated with the reported issue. In an attempt to locate a source of or a contributor to the signal impairment, a service ticket may be generated, which may result in a network technician being dispatched on site to client 120 or DSLAM 410.

In instances where a signal impairment affects a number of different clients 120, any one or more of the affected clients 120 may generate service calls. Certain clients 120 that are affected may not generate any service calls. Furthermore, a particular client 120 may be a source or contributor to signal impairment for a community of clients 120, which may not be evident to the affected users or to service provider 121, who is receiving and processing the service calls (see FIG. 1). Thus, when service calls are handled independently of one another, the administration of customer service to clients 120 may result in redundant service tickets and an over-usage of constrained field support resources, without providing any direct benefit to clients 120.

As described herein, a novel method and system for identifying a source of signal impairment may provide advantageous management of operational performance of MCDN 400. During operation of MCDN 400, a message may be received at a server from an MCDN node indicating that a network impairment has been detected at the MCDN node. As illustrated in one example of MCDN 400 in FIG. 4, the network impairment may be associated with client 120-1, LT uplink 426-1, port 424-1, card 422-1, shelf 420-1, DSLAM 410-1 or a combination thereof. DSLAM 410 may be configured to send a network impairment message to the server based on predetermined criteria. In response to receiving the message or indication of the network impairment, additional MCDN clients 120 or ports 424 may be analyzed to detect an impairment signature associated with the MCDN node.

As noted above, the impairment signature may be embodied by a value, or a pattern, in any one or more of a number of network service parameters. Examples of network service parameters may include: a number of lost packets; a measure of packet latency; a measure of current network throughput at a specified network path; a number of packet re-transmission attempts, a measure of packet jitter representing variations in packet transit time; a maximum attainable bit rate; a number of reinitializations of GW 123 and/or port 424; a number of dropped calls in a voice over Internet protocol (VOIP) channel; memory usage overflow in GW 123 and/or MHD 125; and processor utilization of GW 123 and/or MHD 125, among other parameters (see also FIG. 3). The network service parameters may further include so-called "line error parameters" describing DSL service provided to MCDN client 120 via DSLAM 410. Line error parameters may be generated for upstream traffic (i.e., from client 120 to DSLAM 410 and beyond) and/or for downstream traffic (i.e., from DSLAM 410 to client 120). Examples of line error parameters may include specific counters or measures for: electromagnetic interference; code violations; errored time; severely errored time; loss of signal; loss of frame; unavailable time; uplink driven link reinitializations; and failed reinitializations, among other values.

In certain embodiments, the impairment signature may be associated with a particular MCDN sub-node included in DSLAM 410-1. In one embodiment, the impairment signature is associated with a particular shelf 420 or card 422, and is collectively obtained for all representative MCDN clients associated with the particular shelf 410 or card 422. In other embodiments, the impairment signature is specific to a given MCDN client, such as client 120-1, and is thus correspondingly associated with port 424-1, LT link 426-1, and/or CPE at client 120-1 (i.e., GW 123 (see FIG. 3)). In certain embodiments, the impairment signature may be a device parameter associated with a particular network device, such as a CPE device or port 424.

In one illustrative embodiment, the impairment signature may include a reinitialization count for GW 123 included in client 120-1. GW 123 (not shown in FIG. 4, see FIG. 3) may be coupled to port 424-1 via LT link 426-1. When GW 123 is connected and powered on, it may undergo a reinitialization process, including arbitration of network parameters and settings with port 424-1. GW 123 may further be configured to reinitialize when network traffic across LT link 426-1 reaches an abnormal condition. For example, when a signal impairment affects LT link 426-1, causing network traffic to be interrupted, GW 123 may be configured to automatically reinitialize. During reinitialization, certain device or link parameters can be logged by GW 123 and/or port 424-1. A reinitialization counter may further log a number of times GW 123 has been reinitialized since power up, or over a given time window. Thus, when LT link 426-1 is affected by signal impairment, a reinitialization count stored in GW 123 may be larger than when LT link 426-1 is operating normally. A magnitude of the reinitialization count may further be indicative of a severity (e.g., duration, amplitude, frequency, etc.) of the signal impairment or of a proximity of the signal impairment. Fluctuations in the reinitialization count over time may further be correlated with a temporal attribute of the signal impairment. In this manner, relative values for the reinitialization count among the community of MCDN clients 120 may be indicative of a source of the signal impairment, and may be used to define an impairment signature.

It is noted that the reinitialization count may be queried from GW 123 by DSLAM 410. DSLAM 410 may internally log the reinitialization counts for a number of ports 424 and/or GWs 123. DSLAM 410 may then provide reinitialization counts, or other values associated with an impairment signature, to an MCDN server. In one example, DSLAM 410 accesses database server 190 to store values associated with impairment signatures. An MCDN server executing the methods described herein may access database server 190 to detect an impairment signature.

When the impairment signature has been detected, incoming service requests from users associated with the MCDN node may be bundled into a "master service ticket." The master service ticket may serve to reduce the number of service calls handled by service provider 121 by combining service requests associated with an impairment signature, based on predetermined criteria for network impairments. In this manner, service provider 121 may focus constrained resources on remediating the affected MCDN node, rather than responding to a myriad of service requests for correlated network impairments. Additional information associated with the impairment signature may also be stored under an index to the master service ticket. The master service ticket may also enable notifying one or more of the users sending service requests and informing them of the status of the master service ticket. For example, users may be informed that the network impairment has been detected and/or that the MCDN node is undergoing network service. In this manner, the quality of network service provided to users of MCDN clients 120 may be improved.

Figure 5:
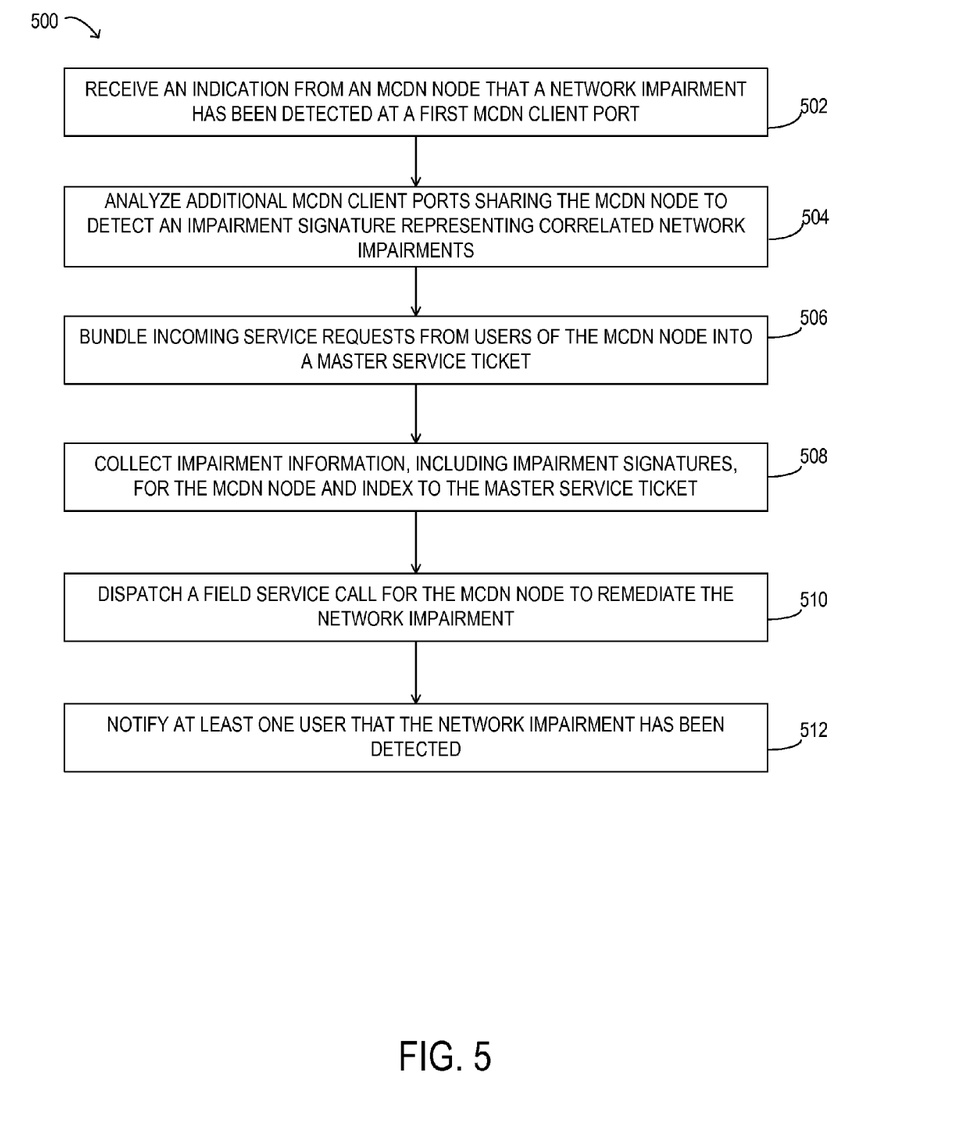
FIG. 5 illustrates an embodiment of a method for identifying an impairment signature.

Turning now to FIG. 5, an embodiment of method 500 for monitoring and managing performance of an MCDN is illustrated in flow chart form. In one embodiment, method 500 may be performed by network performance monitoring and management 710 (see FIG. 7) in conjunction with MCDN 100 and 400 (see FIGS. 1, 4). Method 500 may also involve functionality provided by DSLAM 410 and CPE 122 (see FIGS. 3, 4). It is noted that certain operations described in method 500 may be optional or may be rearranged in different embodiments.

In method 500, an indication that a network impairment has been detected may be received from an MCDN node (operation 502). Additional MCDN client ports sharing the MCDN node may be analyzed to detect an impairment signature representing correlated network impairments (operation 504). The network impairments may be correlated in time, magnitude, pattern, duration, or other aspects. Incoming service requests from users of the MCDN node may be bundled into a master service ticket (operation 506). Impairment information, including impairment signatures, may be collected for the MCDN node and may be indexed to the master service ticket (operation 508). The impairment information may be collected for a predetermined period of time. A field service call for the MCDN node may be dispatched to remediate the network impairment (operation 510). At least one user may be notified that the network impairment has been detected (operation 512). The user may further be notified of a status of remediation efforts associated with the MCDN node.

Figure 6:
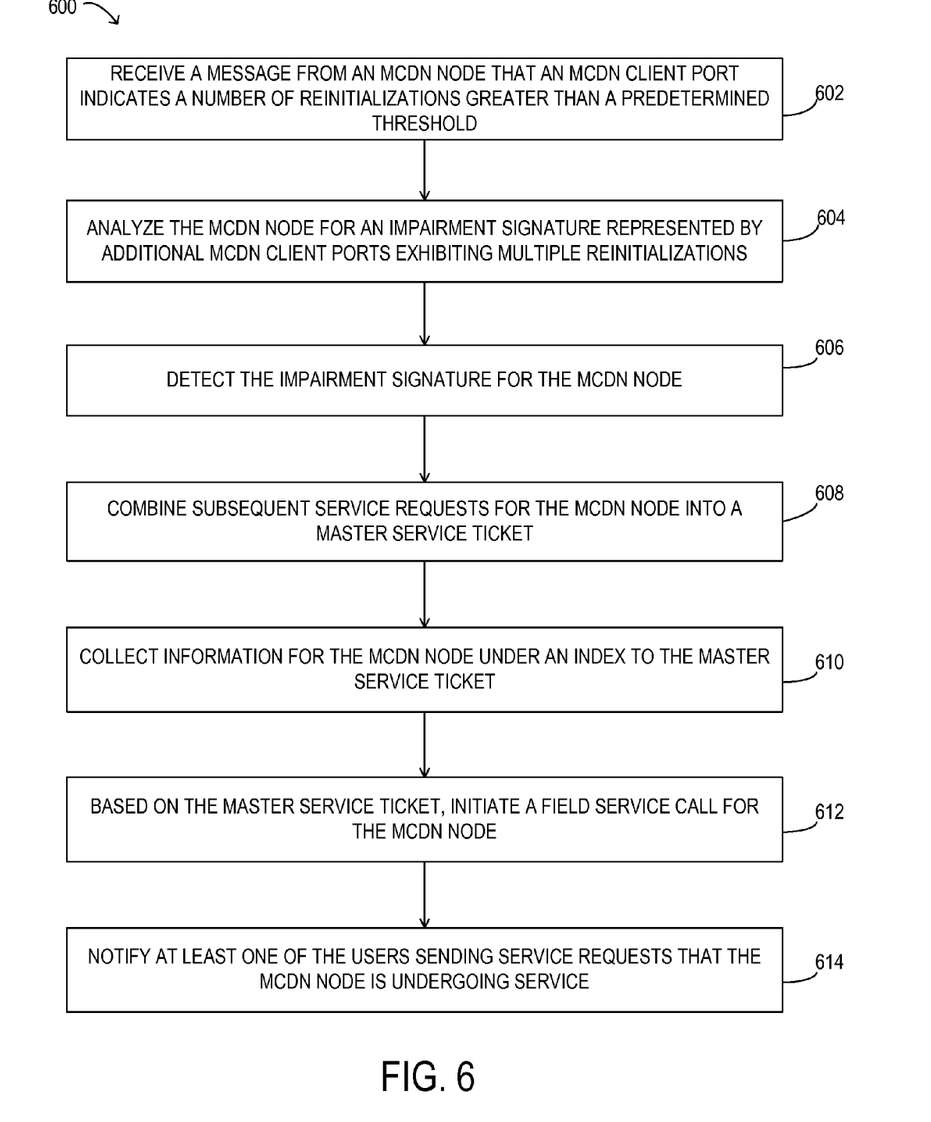
FIG. 6 illustrates an embodiment of a method for identifying an impairment signature.

Turning now to FIG. 6, an embodiment of method 600 for managing performance of an MCDN is illustrated in flow chart form. In one embodiment, method 600 may be performed by network performance monitoring and management 710 (see FIG. 7) in conjunction with MCDN 100 and 400 (see FIGS. 1, 4). Method 600 may also involve functionality provided by DSLAM 410 and CPE 122 (see FIGS. 3, 4). It is noted that certain operations described in method 600 may be optional or may be rearranged in different embodiments. It is further noted that while method 600 is described in terms of a single MCDN client, it will be understood that multiple instances of method 600 may be executed, either concurrently or simultaneously or in a combination thereof, for a plurality of MCDN clients and/or MCDN nodes.

Method 600 may begin with receiving a message from an MCDN node that an MCDN client port indicates a number of reinitializations greater than a predetermined threshold (operation 602). The reinitializations may be counted for a fixed interval for comparison with the threshold. The MCDN node may be analyzed for an impairment signature represented by additional MCDN client ports exhibiting multiple reinitializations (operation 604). The additional MCDN client ports may also be analyzed with respect to the predetermined threshold. The impairment signature may be detected for the MCDN node (operation 606). Subsequent service requests for the MCDN node may be combined into a master service ticket (operation 608). Information for the MCDN node may be collected under an index to the master service ticket (operation 610). The collected information may include the impairment signature. Based on the master service ticket, a field service call may be initiated for the MCDN node (operation 612). At least one of the users sending service requests may be notified that the MCDN node is undergoing service (operation 614).

Figure 7:
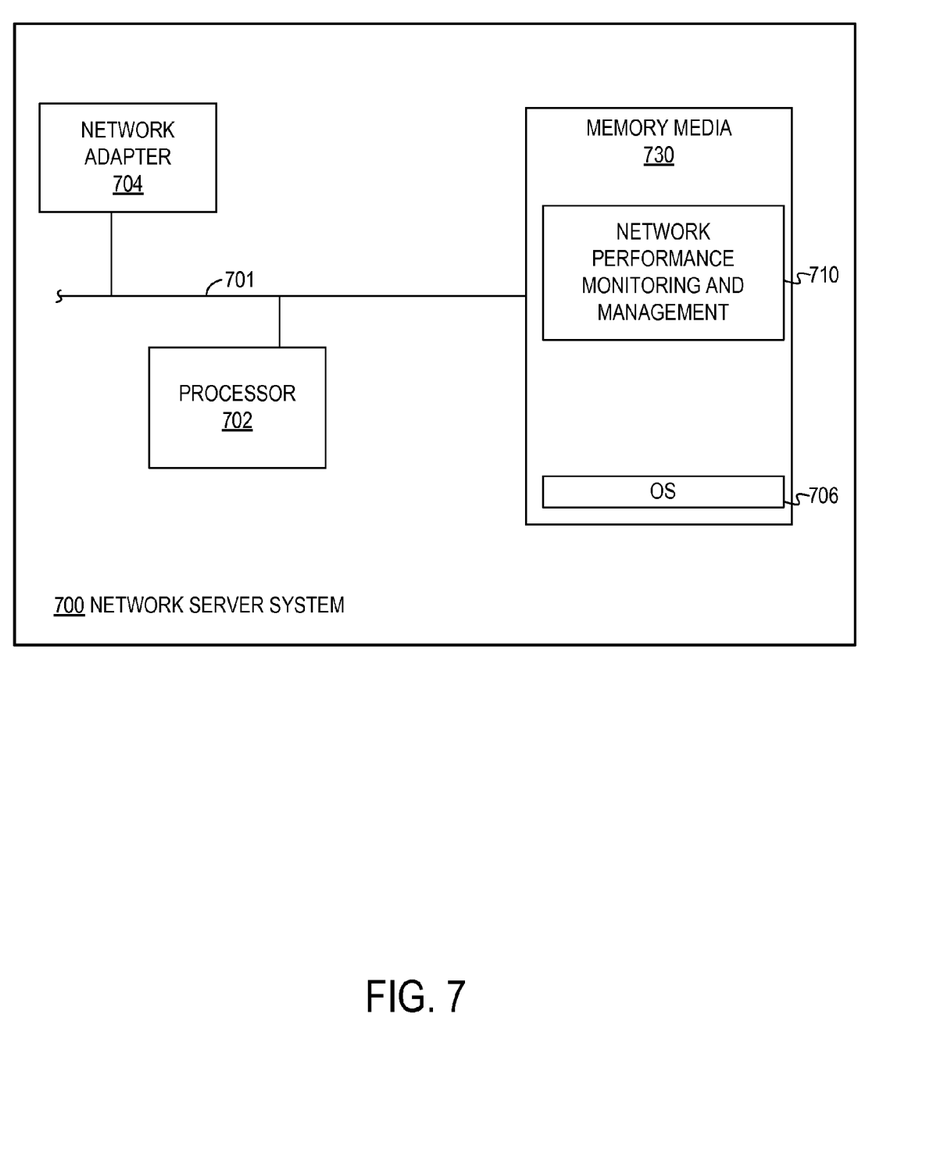
FIG. 7 is a block diagram of selected elements of an embodiment of a network server system.

Referring now to FIG. 7, a block diagram illustrating selected elements of an embodiment of network server system 700 is presented. In FIG. 7, network server system 700 represents an example embodiment of application server 150, which may operate in conjunction with database server 190 (see FIG. 1) to execute the methods and operations described herein.

In the embodiment depicted in FIG. 7, network server system 700 includes processor 702 coupled via shared bus 701 to storage media collectively identified as storage or memory media 730. Network server system 700, as depicted in FIG. 7, further includes network adapter 704 that interfaces network server system 700 to switching network 140 and through which network server system 700 may communicate with other elements of MCDN 100 (see FIG. 1). In certain embodiments, network server system 700 may alternatively be located external to MCDN 100, such that network adapter 704 provides access to MCDN 100.

Memory media 730 encompasses persistent and volatile media, fixed and removable media, and magnetic and semiconductor media. Memory media 730 is operable to store instructions, data, or both. Memory media 730 as shown may include sets or sequences of instructions, namely, an operating system 706, and network performance monitoring and management 710. Operating system 706 may be a UNIX or UNIX-like operating system, a Windows® family operating system, or another suitable operating system. In some embodiments, memory media 730 is configured to store and execute instructions provided as services to client 120 by application server 150, as mentioned previously. It is noted that network performance monitoring and management 710 may execute the methods and operations described herein, such as method 600 (see FIG. 6) and/or method 700 (see FIG. 7), or other operations.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for managing a multimedia content distribution network (MCDN), comprising:
    receiving an indication from an MCDN node that a network impairment has been detected at a first MCDN client port;
    in response to receiving the indication, analyzing additional MCDN client ports sharing the MCDN node with the first MCDN client port to detect an impairment signature associated with the MCDN node; and
    when the impairment signature has been detected at the MCDN node, bundling, by a server, incoming service requests from users associated with the MCDN node into a master service ticket, wherein impairment information, including the impairment signature, for the MCDN node is collected under an index to the master service ticket;
    wherein the additional MCDN client ports share an MCDN sub-node with the first MCDN client port, and wherein the impairment signature is indicative of a network impairment correlated in magnitude between the additional MCDN client ports and the first MCDN port.

2. The method of claim 1, further comprising:
    based on the impairment information, dispatching a field service call for the MCDN node to remediate the network impairment.

3. The method of claim 2, wherein the impairment information is collected for a specified minimum period of time prior to said dispatching.

4. The method of claim 1, further comprising:
    notifying at least one of the users associated with the MCDN node that the network impairment has been detected.

5. The method of claim 1, wherein the indication of the network impairment is associated with a number of reinitializations of a gateway device at a first MCDN client coupled to the first client port.

6. The method of claim 5, wherein the MCDN node queries the gateway device for the number of reinitializations.

7. A computer system for monitoring and managing a multimedia content distribution network (MCDN), the system comprising:
    a processor coupled to memory media;
    wherein the memory media stores processor executable program instructions wherein the processor, when executing program instructions, performs operations including:
    receiving a message from an MCDN node that an MCDN client port coupled to the MCDN node indicates a number of reinitializations greater than a predetermined threshold;
    in response to receiving the message, analyzing reinitializations of additional MCDN clients associated with the MCDN node for an impairment signature indicating a common source of signal impairment affecting a plurality of the MCDN clients associated with the MCDN node; and
    when the impairment signature has been detected at the MCDN node, combining subsequent service requests received from users associated with the MCDN node into a master service ticket.

8. The computer system of claim 7, wherein the message is received from a gateway at an MCDN client coupled to the MCDN client port, and wherein the MCDN node provides digital subscriber line network service via the MCDN client port.

9. The computer system of claim 7, wherein the reinitializations are logged at the MCDN node.

10. The computer system of claim 7, wherein information, including the impairment signature, for the MCDN node is collected under an index to the master service ticket, and further comprising processor instructions executable to:
    initiate a field service call for the MCDN node based on the information associated with the master service ticket.

11. The computer system of claim 10, wherein the information is collected for a specified minimum period of time prior to initiating the field service call.

12. The computer system of claim 10, wherein the field service call is directed towards the combined service requests in the master service ticket.

13. The computer system of claim 7, further comprising processor instructions executable to:
    notify at least one of the users associated with the MCDN node that the MCDN node is undergoing service.

14. Computer-readable memory media, including instructions for monitoring a multimedia content distribution network (MCDN), said instructions executable to:
    receive an indication from an MCDN node that a network impairment has been detected at a first MCDN client port;
    in response to the indication, analyze additional MCDN client ports sharing the MCDN node with the first MCDN client port to detect an impairment signature indicating a common source of signal impairment for a plurality of MCDN client ports associated with the MCDN node;
    when the impairment signature has been detected at the MCDN node, bundle subsequent service requests from users associated with the MCDN node into a master service ticket, wherein impairment information, including the impairment signature, for the MCDN node is collected under an index to the master service ticket; and
    in response to receiving a service request, notify at least one of the users associated with the MCDN node that the network impairment has been identified.

15. The memory media of claim 14, further comprising instructions executable to:
    based on the impairment information, dispatch a field service call for the MCDN node to remediate the network impairment.

16. The memory media of claim 15, wherein the impairment information is collected for a specified minimum period of time before the field service call is dispatched.

17. The memory media of claim 14, wherein the additional MCDN client ports share an MCDN sub-node with the first MCDN client port, and wherein the impairment signature is indicative of network impairments correlated in magnitude between the additional MCDN client ports and the first MCDN client port.

18. The memory media of claim 14, wherein the indication of the network impairment is a number of reinitializations of a gateway device at a first MCDN client coupled to the first MCDN client port.

19. The memory media of claim 18, further comprising instructions executable to:
query the number of reinitializations from at least one of: the MCDN node; and the gateway device.

\* \* \* \* \*